US012662618B2

(12) United States Patent
García López De Victoria et al.

(10) Patent No.: US 12,662,618 B2
(45) Date of Patent: Jun. 23, 2026

(54) NANOPARTICLES AND ABSORBENT POLYMER WELLBORE CLEANOUT COMPOSITIONS AND METHODS OF USE THEREOF

(71) Applicant: Weatherford Technology Holdings, LLC., Houston, TX (US)

(72) Inventors: Marieliz García López De Victoria, Sugar Land, TX (US); Francisco E. Fragachan, Katy, TX (US); Edgar Darío Amaya Mantilla, Villahermosa Tabasco (MX)

(73) Assignee: Weatherford Technology Holdings, LLC., Houston, TX (US)

( * ) Notice: Subject to any disclaimer, the term of this patent is extended or adjusted under 35 U.S.C. 154(b) by 0 days.

(21) Appl. No.: 18/943,601

(22) Filed: Nov. 11, 2024

(65) Prior Publication Data

US 2026/0132329 A1 May 14, 2026

Related U.S. Application Data

(60) Provisional application No. 63/718,280, filed on Nov. 8, 2024.

(51) Int. Cl.
| | |
|---|---|
| *E21B 37/06* | (2006.01) |
| *C09K 8/528* | (2006.01) |
| *C09K 8/536* | (2006.01) |

(52) U.S. Cl.
CPC ............. *C09K 8/536* (2013.01); *C09K 8/528* (2013.01); *E21B 37/06* (2013.01); *C09K 2208/10* (2013.01); *C09K 2208/34* (2013.01)

(58) Field of Classification Search
CPC .... C09K 8/536; C09K 8/528; C09K 2208/10; C09K 2208/34; E21B 37/06
See application file for complete search history.

(56) References Cited

U.S. PATENT DOCUMENTS

| | | | |
|---|---|---|---|
| 7,475,730 B2 | 1/2009 | Brown et al. | |
| 8,162,056 B2 * | 4/2012 | Bustos ..................... | C09K 8/36 |
| | | | 166/279 |
| 2005/0107265 A1 * | 5/2005 | Sullivan ................ | C09K 8/845 |
| | | | 507/271 |
| 2011/0237467 A1 * | 9/2011 | Cornette .................. | C09K 8/32 |
| | | | 977/902 |
| 2015/0027702 A1 * | 1/2015 | Godoy-Vargas ....... | C09K 8/887 |
| | | | 507/224 |
| 2015/0065398 A1 * | 3/2015 | Gartland .................. | C09K 8/54 |
| | | | 507/136 |
| 2016/0289547 A1 * | 10/2016 | Gupta ..................... | C09K 8/703 |
| 2016/0290104 A1 | 10/2016 | Nelson et al. | |
| 2024/0010902 A1 * | 1/2024 | Deville .................. | C09K 8/516 |

FOREIGN PATENT DOCUMENTS

| | | |
|---|---|---|
| WO | 2006097227 A2 | 9/2006 |
| WO | 2011011714 A1 | 1/2011 |

OTHER PUBLICATIONS

Solvay Proppant Placement Polymer DV5-23833.
PCT International Search Report & Written Opinion pertaining to International Application No. PCT/US2025/048391; Date of Mailing: Jan. 20, 2026.

* cited by examiner

*Primary Examiner* — Silvana C Runyan
(74) *Attorney, Agent, or Firm* — Vorys, Sater, Seymour and Pease LLP

(57) ABSTRACT

Methods for wellbore cleanout operations may comprise introducing a wellbore cleanout fluid through one or more conduits into a wellbore, the cleanout fluid comprising an aqueous base fluid, an absorbent polymer, and a lubricant; wherein the lubricant comprises a colloidal dispersion fluid and nanoparticles, the nanoparticles have a particle size distribution characterized by a D50 value of about 1 nm to about 120 nm and are present in an amount of about 0.1 wt % to about 10 wt %, based on the weight of the lubricant.

11 Claims, 13 Drawing Sheets

Rate of Penetration

—— SureLube HT    ······· Control 1    ----- Control 2    — · — Control 3

NANOPARTICLES AND ABSORBENT POLYMER WELLBORE CLEANOUT COMPOSITIONS AND METHODS OF USE THEREOF

FIELD

The present disclosure generally relates to wellbore cleanout, and more specifically, to wellbore cleanout fluids comprising lubricants.

BACKGROUND

A wellbore cleanout operation is a critical procedure in the oil and gas industry, aimed at removing debris, such as residual drilling fluids, cuttings, scale, and sand, as well as other obstructions from the wellbore to ensure optimal production and safety. This operation requires careful planning and the use of specialized techniques, fluids, and equipment to ensure effective cleanout of the wellbore to maintain the integrity and efficiency of the well. Effective wellbore cleanout operations improve well productivity, extend the lifespan of the well, and reduce the risk of costly interventions or downtime.

Wellbore cleanout fluids are used in such operations and are specifically formulated to remove debris, scale, and other obstructions from the wellbore, which can hinder production and damage equipment. The selection of the appropriate cleanout fluid depends on the type of debris, wellbore conditions, and operational constraints. By carefully considering these factors, operators can choose the most effective cleanout fluid for their specific needs.

The duration of a wellbore cleanout operation can vary significantly depending on several factors, including the depth and complexity of the well, the type of debris or obstructions present, and the specific cleanout techniques and fluids used. Generally, a standard wellbore cleanout might take anywhere from a few days to a couple of weeks.

For extended reach wells, which are characterized by their greater length, significant horizontal displacement, and technical complexity, the cleanout process can take longer. These wells often require more sophisticated equipment and techniques to ensure that the entire length of the wellbore is effectively cleaned. As a result, a cleanout operation in extended reach wells can extend for longer times up to several weeks or even months, depending on the specific challenges encountered.

During a wellbore cleanout process, the well is non-productive, meaning no hydrocarbons are being extracted (and therefore, no revenue is being generated). Extended downtime directly translates to lost income, which can be particularly impactful for high-producing wells. Additionally, prolonged cleanout operations incur ongoing expenses such as labor, equipment rental, and the cost of cleanout fluids and other consumables. Thus, it is desirable to reduce time for the cleanout process.

SUMMARY

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one or more non-limiting aspects, the present disclosure provides methods for wellbore cleanout operations comprising: introducing a wellbore cleanout fluid through one or more conduits into a wellbore, the cleanout fluid comprising an aqueous base fluid, an absorbent polymer, and a lubricant; wherein the lubricant comprises a colloidal dispersion fluid and nanoparticles, the nanoparticles have a particle size distribution characterized by a D50 value of about 1 nm to about 120 nm and are present in an amount of about 0.1 wt % to about 10 wt %, based on the weight of the lubricant.

In one or more non-limiting aspects, the present disclosure provides a wellbore cleanout fluid comprising: an aqueous base fluid, an absorbent polymer, and a lubricant; wherein the lubricant comprises a colloidal dispersion fluid and nanoparticles, the nanoparticles present in an amount of about 0.1 wt % to about 10 wt %, based on the weight of the lubricant; wherein the nanoparticles have a particle size distribution characterized by a D50 value of about 1 nm to about 120 nm.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
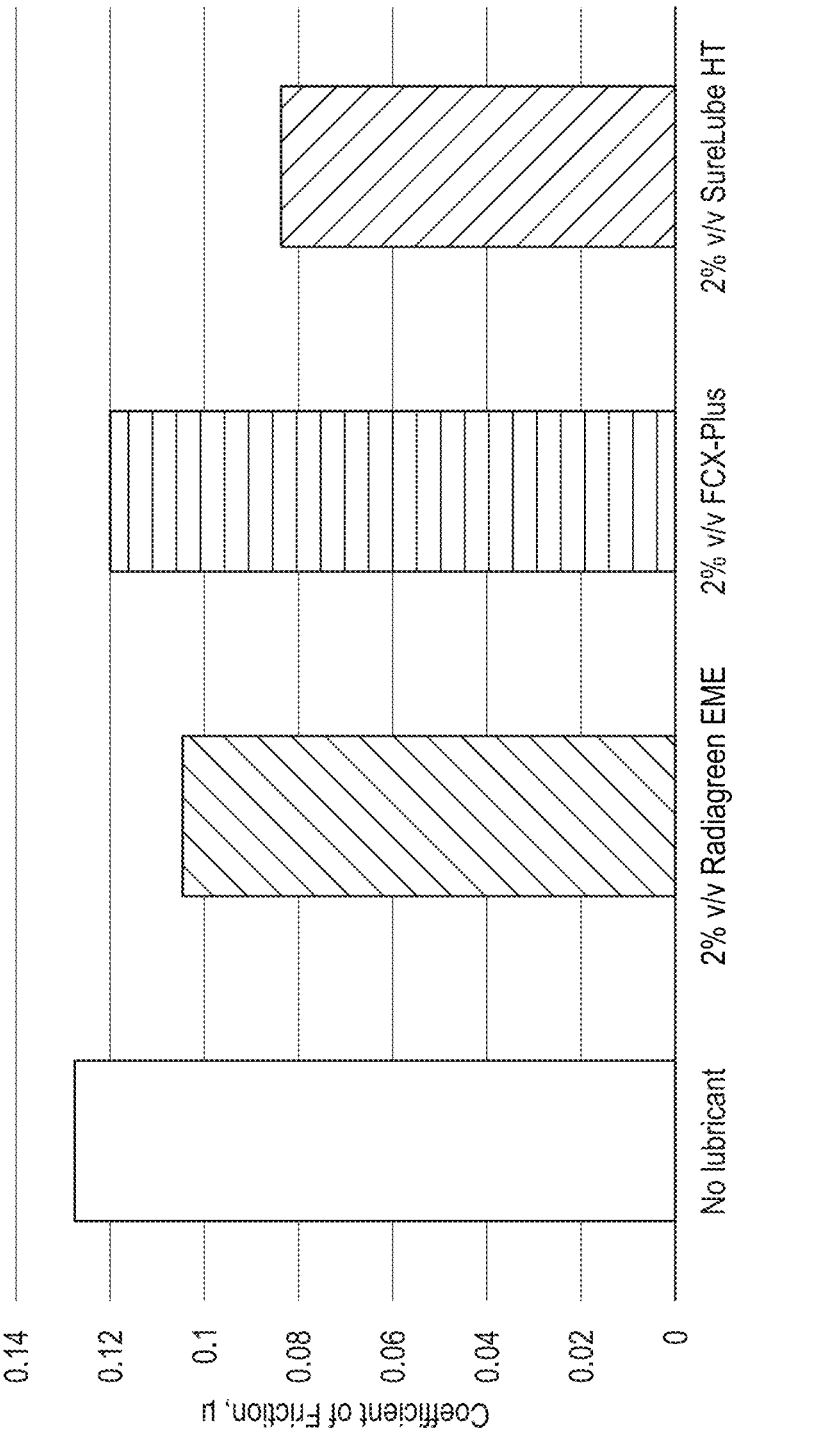
FIG. 1 shows the coefficient of friction for various lubricants in NaCl brine as discussed in the Examples.

The present disclosure generally relates to wellbore cleanout, and more specifically, to wellbore cleanout fluids comprising nanoparticles.

The wellbore cleanout operations and fluids of the present disclosure provide optimized wellbore cleanout. The methods disclosed herein may be useful in a variety of wellbores including traditional vertical wells as wellbore, as extended reach wells, or other horizontal wells. The wellbore cleanout fluids of this disclosure may have a higher viscosity and lubricity coefficient as compared to other cleanout fluids, which enables the wellbore cleanout operations of this disclosure to have a higher rate of penetration, reduce friction and forces during cleanout, and result in a faster, more efficient wellbore cleanout.

An example of the wellbore cleanout operations of the present disclosure includes a method comprising: introducing a wellbore cleanout fluid through a conduit into a wellbore, the cleanout fluid comprising an aqueous base fluid; an absorbent polymer; and a lubricant that comprises nanoparticles and a colloidal dispersion fluid, the nanoparticles have a particle size distribution characterized by a D50 value between about 1 nm to about 100 nm and are present in an amount of about 0.1 wt % to about 10 wt %, based on the weight of the lubricant.

Suitable aqueous base fluids for use in the wellbore cleanout fluids provided in this disclosure include aqueous fluids that are compatible with the absorbent polymer and the lubricant. Considerations that should be taken into account when choosing the aqueous base fluid include the pH and salt content of the aqueous base fluid. Example aqueous base fluids may include fresh water, deionized water, stream water, municipal treated water, saltwater, natural or synthetic brines, brackish water, partially desalinated water, wastewater, non-potable water, grey water, industrial process water, purified wastewater, produced water, flowback water, the like, and any combination thereof. The aqueous base fluid may be included in wellbore cleanout fluids as described herein in an amount of about 70 wt % to about 99.5 wt %.

Suitable absorbent polymers for use in the wellbore cleanout fluids of this disclosure include any polymer that absorbs aqueous liquid, such as water or brine, to form a gel or viscous material. Examples of suitable absorbent polymers include poly(hydroxy $C_1$-$C_8$ alkyl (meth)acrylate)s such as (2-hydroxyethyl acrylate), poly(meth)acrylamide, poly(vinyl pyrrolidine), poly(vinyl acetate), starch-acrylonitrile grafted copolymer of polyacrylonitrile, carboxymethyl cellulose, polyacrylates, sulfonated polystyrene, hydrolyzed polyacrylamide, polyvinyl alcohol, polyethylene oxide, polyvinyl pyrrolidone, polyacrylonitrile, the like, as wellbore, as combinations of these and copolymers of these, for example, copolymers of (meth)acrylamide with maleic anhydride, vinyl acetate, ethylene oxide, ethylene glycol, or acrylonitrile, or combinations thereof. In an embodiment, the absorbent polymer includes a repeating unit derived from an acrylate, an acrylic acid or a salt thereof, an acrylamide, a vinylpyrrolidone, a vinyl ester (e.g., a vinyl acetate), a vinyl alcohol, a 2-acrylamide-2-methylpropanesulfonic acid, a derivative thereof, or a combination thereof. In some embodiments, the absorbent polymer is a copolymer of 2-acrylamido-2-methylpropane sulfonate and acrylamide.

Optionally, suitable absorbent polymers may be polymers synthesized from nonionic, anionic, cationic monomers, or combinations thereof. Suitable absorbent polymers may include polymers that were synthesized via free-radical polymerization, solution polymerization, gel polymerization, emulsion polymerization, dispersion polymerization, or suspension polymerization.

Suitable nonionic monomers of the absorbent polymers include (meth)acrylamide, alkyl-substituted (meth)acrylamides, aminoalkyl-substituted (meth)acrylamides, alkyliminoalkyl-substituted (meth)acrylamides, vinyl alcohol, vinyl acetate, allyl alcohol, $C_1$-$C_8$alkyl (meth)acrylates, hydroxy $C_1$-$C_8$alkyl (meth)acrylates such as hydroxyethyl (meth)acrylate, N-vinylformamide, N-vinylacetamide, and (meth)acrylonitrile. As used herein, "poly((meth)acrylamide)s" includes polymer comprising units derived from (meth)acrylamide, alkyl-substituted (meth)acrylamides such as N—$C_1$-$C_8$ alkyl (meth)acrylamides and N,N-di($C_1$-$C_8$alkyl) (meth)acrylamides, aminoalkyl-substituted (meth)acrylamides such as N,N-di(amino ($C_1$-$C_8$ alkyl))-substituted (meth)acrylamides, and (N,N-dialkylamino)alkyl-substituted (meth)acrylamides such as (N,N-di($C_1$-$C_8$ alkyl)amino)($C_1$-$C_8$alkyl) (meth)acrylamides. Specific examples of the foregoing monomers include methacrylamide, N-methyl acrylamide, N-methyl methacrylamide, N,N-dimethyl acrylamide, N-ethyl acrylamide, N,N-diethyl acrylamide, N-cyclohexyl acrylamide, N-benzyl acrylamide, N,N-dimethylaminopropyl acrylamide, N,N-dimethylaminoethyl acrylamide, N-tert-butyl acrylamide, or combinations thereof. In an embodiment, the poly((meth)acrylamide) is a copolymer of methacrylamide with maleic anhydride, vinyl acetate, ethylene oxide, ethylene glycol, or acrylonitrile, or combinations thereof.

Suitable anionic monomers of the absorbent polymers include ethylenically unsaturated anionic monomers having acidic groups, for example, carboxylic groups, sulfonic groups, phosphonic groups, salts thereof, the corresponding anhydrides or acyl halides, or combinations thereof. For example, the anionic monomer may be (meth)acrylic acid, ethacrylic acid, maleic acid, maleic anhydride, fumaric acid, itaconic acid, α-chloroacrylic acid, β-cyanoacrylic acid, β-methylacrylic acid, α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, salts, or combinations thereof.

Suitable cationic monomers of the absorbent polymers include (N,N-di($C_1$-$C_8$ alkylamino)($C_1$-$C_8$alkyl) (meth)acrylates (e.g., N,N-dimethylaminoethyl acrylate and N,N-dimethylaminoethyl methacrylate), (wherein the amino group is quaternized to, e.g., a methyl chloride quaternary form), diallyldimethyl ammonium chloride, or any of the foregoing alkyl-substituted (meth)acrylamides and dialkylaminoalkyl-substituted (meth)acrylamides, such as (N,N-di ($C_1$-$C_8$alkyl)amino) $C_1$-$C_8$alkyl acrylamide, and the quaternary forms thereof such as acrylamidopropyl trimethyl ammonium chloride.

The absorbent polymers may contain both cationic substituents and anionic substituents. The cationic substituents and anionic substituents may occur in various stoichiometric proportions, for example, at a ratio of about 1:1, or one monomer can be present in a greater stoichiometric amount than the other monomer. Representative amphoteric polymers include terpolymers of nonionic monomers, anionic monomers, and cationic monomers.

In some embodiments, the absorbent polymer may be crosslinked via crosslinking agents. Suitable crosslinking agents include crosslinking agents able to form covalent bonds between polymer chains of the absorbent polymers. Example crosslinking agents include polyols, polyamines, polyaminoalcohols, and alkylene carbonates, such as ethylene glycol, diethylene glycol, triethylene glycol, polyethylene glycol, glycerol, polyglycerol, propylene glycol, diethanolamine, triethanolamine, polypropylene glycol, block copolymers of ethylene oxide and propylene oxide, sorbitan fatty acid esters, ethoxylated sorbitan fatty acid esters, trimethylolpropane, ethoxylated trimethylolpropane, pentacrythritol, ethoxylated pentaerythritol, polyvinyl alcohol, sorbitol, ethylene carbonate, propylene carbonate, di(meth) acrylamides of diamines such as a diacrylamide of piperazine, a $C_1$-$C_8$ alkylene bisacrylamide such as methylene bisacrylamide and ethylene bisacrylamide, N-methylol compounds of unsaturated amides such as N-methylol methacrylamide or N-methylol acrylamide, a (meth)acrylate esters of a di-, tri-, or tetrahydroxy compounds such as ethylene glycol diacrylate, poly(ethyleneglycol) di(meth)acrylate, trimethylopropane tri(meth)acrylate, ethoxylated trimethylol tri(meth)acrylate, glycerol tri(meth)acrylate, ethoxylated glycerol tri(meth)acrylate, pentacrythritol tetra(meth) acrylate, ethoxylated pentaerythritol tetra(meth)acrylate, butanediol di(meth)acrylate), divinyl or diallyl compounds such as allyl (meth)acrylate, alkoxylated allyl(meth)acrylate, diallylamide of 2,2'-azobis(isobutyric acid), triallyl cyanurate, triallyl isocyanurate, maleic acid diallyl ester, polyallyl esters, tetraallyloxyethane, triallylamine, and tetraallylethylene diamine, hydroxyallyl, or acrylate compounds, and allyl esters of phosphoric acids or phosphorous acids. Additional example crosslinking agents include borates, titanates, zirconates, aluminates, chromates, or combinations thereof. Boron crosslinking agents include boric acids, sodium tetraborates, encapsulated borates, and the like. Borate crosslinking agents may be used with buffers and pH control agents including sodium hydroxide, magnesium oxide, sodium sesquicarbonate, and sodium carbonate, amines (such as hydroxyalkyl amines, anilines, pyridines, pyrimidines, quinolines, pyrrolidines, and carboxylates such as acetates and oxalates), delay agents including sorbitol, aldehydes, sodium gluconate, and the like. Example zirconium crosslinking agents include zirconium lactates (e.g., sodium zirconium lactate), triethanolamines, 2,2'-iminodiethanol, or combinations thereof. Example titanates crosslinking agents include lactates, triethanolamines, and the like. Combinations comprising any of the above-described crosslinking agents may also be used. Additional crosslinking agents are described in U.S. 2014/0332213, U.S. 2014/0332214, and U.S. 2015/0096751.

The absorbent polymers may be present in the cleanout fluid in an amount of about 0.1 gallon per thousand (gpt) to about 12 gpt, including all values and subsets therebetween, such as about 1 gpt to about 4 gpt or about 4 gpt to about 10 gpt. The absorbent polymers may be present in the cleanout fluid in an amount of about 0.1 wt % to about 4 wt %, including all values and subsets therebetween, such as about 1 wt % to about 2 wt %.

Lubricants suitable for use in the operations and fluids of this disclosure may comprise nanoparticles and colloidal dispersion fluids, the nanoparticles having a particle size distribution characterized by a D50 value between about 1 nm to about 100 nm.

Suitable nanoparticles for use in the lubricants include nanoparticles that can reduce friction between components in the conduit. Example nanoparticles include metal hydroxides (e.g., iron hydroxide), metal oxides (e.g., iron oxide), aluminum oxide, suboxides, oxyhydroxides, hematite, magnesium, nickel, zinc, magnetite, metal carbonates (e.g., calcium carbonate), metal sulphates (e.g., barium sulfate), metal sulfides (e.g., iron sulfide), the like, or combinations thereof. Suitable nanoparticles may have a particle size distribution characterized by a D50 value in a range of about 1 nm to about 120 nm, including all values and subsets therebetween, including about 1 nm to about 30 nm, about 30 to about 90 nm, or about 90 nm to about 120 nm. The particle size distribution may be measured by dynamic light scattering. The nanoparticles may be present in a suitable lubricant in an amount of about 0.1 wt % to about 10 wt %, by weight of the lubricant, including all values and subsets therebetween, including about 0.1 wt % to about 3 wt %, about 3 wt % to about 5 wt %, or about 5 wt % to about 10 wt %.

Suitable colloidal dispersion fluids for use in the lubricants include colloidal dispersion fluids that can mix with and disperse nanoparticles. Example colloidal dispersion fluids include oleaginous fluids. Example oleaginous fluids include naturally-derived and synthetically-derived oils derived from petroleum, mineral oils, diesel oils, linear or branched olefins, polyolefins, alkanes, paraffins, hydrotreated oils, petroleum distillates, fatty acids, esters of fatty acids, straight chain, branched or cyclical alky ethers of fatty acids, triglycerides (e.g., glyceryl trioleate), other petroleum-derived oils, the like, and combinations thereof. The example oleaginous fluids may include esters, ethers, acetals, dialkylcarbonates, poly diorganosiloxanes, siloxanes, organosiloxanes, other silicone-based oils, or combinations thereof. The colloidal dispersion fluid may be present in a lubricant in an amount of about 99.9 wt % to about 90 wt %, by weight of the lubricant, including all values and subsets therebetween, including about 99 wt % to about 95 wt %.

Optionally, suitable lubricants include non-nanoparticle formulations, which may include mineral oils, synthetic oils, glycols, triglycerides, polymer lubricants, solid lubricants (graphite, calcium carbonate flakes, glass, plastic beads), the like, or combinations thereof.

Suitable lubricants may have a coefficient of friction of about 0.02 to about 0.5 in deionized water, including all values and subsets therebetween, including of about 0.150 to about 0.027 or about 0.05 to about 0.027, as tested via an OFI Lubricity Tester model #112 hot-rolled at 300° F. for 16 hours. As used herein, the "coefficient of friction" and grammatical equivalents thereof, is the ratio of the measured torque required to rotate the testing surface and load applied to the testing surface.

The lubricants may be present in a wellbore cleanout fluid according to this disclosure in an amount of about 0.1 wt % to about 10 wt %, based on the weight of the wellbore cleanout fluid, including all values and subsets therebetween, including about 0.1 wt % to about 3 wt % or about 1 wt % to about 2 wt %. The lubricants may be present in the wellbore cleanout fluids in an amount of about 100 gpt to about 300 gpt, including all values and subsets therebetween, including about 150 gpt to about 250 gpt or about 200 gpt.

Optionally, the wellbore cleanout fluids of this disclosure may include at least one foaming agent. Suitable foaming agents include foaming agents that create a foamed wellbore cleanout fluid that is stable at elevated temperatures and pressures for subterranean formations. Examples of suitable foaming agents include non-ionic surfactants, cationic surfactants, anionic surfactants, amphoteric/zwitterionic surfactants, and mixtures thereof. Examples of non-ionic surfactants include alkoxylated alcohols or ethers, alkyl ethoxylates, alkylamido ethoxylates, alkylamine ethoxylate, alkyl glucosides, alkoxylated carboxylic acids, sorbitan derivatives where the alkyl chain length varies from 8 to 24, for example, nonylphenol ethoxylate, alkyl ethoxylates, oleyl carboxylic diethylamides, the like, and mixtures thereof. Examples of cationic surfactants include monoalkyl quaternary amines such as cocotrimonium chloride, cetyltrimonium chloride, stearyltrimonium chloride, soyatrimonium chloride, and bchentrimonium chloride, dialkyl quaternary amines such as dicetyldimethyl ammonium chloride, dicocodimethyl ammonium chloride and distearyldimethyl ammonium chloride, the like, and mixtures thereof. Examples of anionic surfactants include fatty carboxylates, alkyl sarcosinates, alkyl phosphates, alkyl sulfonate, alkyl sulfates, the like, and mixtures thereof. Examples of amphoteric/zwitterionic surfactants include alkyl betaines, alkylamido propyl betaines, alkylampho acetates, alkylamphopropionates, alkylamidopropyl hydroxysultaines, the like, and mixtures thereof. In some embodiments, the foaming agent is an olefinic sulfate, olefinic sulfonate, ethoxylated sulfate, cocoamidopropyl dimethyl ammonium acetate (betaine), coco betaine, butoxyethanol, the like, or combinations thereof. In some embodiments, the foaming agent comprises at least one surfactant and at least one co-surfactant. Examples of the co-surfactant are organic solvents such as ethylene glycol monobutyl ether, isopropyl alcohol, methanol, glycerol, ethylene glycol, mineral oil, the like, or combinations thereof. The foaming agents may be present in the wellbore cleanout fluids in an amount of about 0.1 wt % to about 5 wt %, by weight of the wellbore cleanout fluids, including all values and subsets therebetween, including about 0.5 wt % to about 3 wt % or about 1 wt % to about 2 wt %.

Optionally, the wellbore cleanout fluid of this disclosure may include at least foaming gas. Suitable foaming gases include foaming gases that are stable at elevated temperatures and pressures for subterranean formations and create a foam in cooperation with the foaming agents and aqueous base fluids. Example foaming gasses include air, nitrogen, carbon dioxide, natural gas, the like, and combinations thereof.

The wellbore cleanout fluids of this disclosure may be foamed before being introduced into a wellbore by mixing the wellbore cleanout fluids with foaming gases. The foamed wellbore cleanout fluids may be foamed to a foam quality of about 35% to about 80%, including all values and subsets therebetween, including about 40% to about 65%. Foam quality as discussed herein is defined by the following equation:

$$\text{Foam \%} = \frac{V_f - V_s}{V_f}$$

where $V_f$ is the volume of foamed wellbore cleanout fluid and Vs is the volume of the wellbore cleanout fluid before foaming it.

The wellbore cleanout fluids of this disclosure may be introduced into a wellbore for a cleanout operation by one or more conduits. Such conduits may include drilling string, tubing string, joined tubing, coiled tubing, or combinations thereof as recognized by one of ordinary skill in the art. In one example of a wellbore cleanout operation provided herein, a wellbore cleanout fluid of this disclosure is placed in a wellbore via coiled tubing for a wellbore cleanout operation and removing debris from the wellbore via the return of the wellbore cleanout fluid. In this exemplary wellbore cleanout operation using coiled tubing, the coiled tubing may be introduced into the wellbore and wellbore cleanout fluid circulated in the wellbore. The circulated wellbore cleanout fluid returns the debris to the surface of the wellbore via an annular space between the coiled tubing and the wall of the wellbore. The coiled tubing may optionally have a jet nozzle or mill at the front of it to aid in removing debris from the wellbore. The jet nozzle may be used to detach debris from the wellbore and suspend the debris in it.

In some embodiments, the wellbore cleanout operation is performed on an extended reach wellbore. As used herein, "extended reach wellbore" and grammatical variants thereof refer to a wellbore where the drilled horizontal displacement from the surface is greater than the well's vertical depth.

In some embodiments, the methods may include hydrating the absorbent polymer of the cleanout fluid in an aqueous fluid before introducing the cleanout fluid into a wellbore. The hydrating time may be about 0.1 h to about 3 h, including all values and subsets therebetween, including about 0.5 h to about 1 h.

The methods may include wherein the rate of penetration of the coiled tubing conduit during the methods for wellbore cleanout is about 6 feet/minute (ft/min) to about 15 ft/min, including all values and subsets therebetween, such as about 6 ft/min to about 8 ft/min or about 10 ft/min to about 15 ft/min.

Non-Limiting Clauses

The present disclosure is further directed to the following non-limiting clauses:

Clause 1: A method for wellbore cleanout comprising: introducing a wellbore cleanout fluid through one or more conduits into a wellbore, the cleanout fluid comprising an aqueous base fluid, an absorbent polymer, and a lubricant; wherein the lubricant comprises a colloidal dispersion fluid and nanoparticles, the nanoparticles have a particle size distribution characterized by a D50 value of about 1 nm to about 120 nm and are present in an amount of about 0.1 wt % to about 10 wt %, based on the weight of the lubricant.

Clause 2: The method of clause 1, wherein the one or more conduits include at least one selected from the group consisting of drilling string, tubing string, joined tubing, and coiled tubing.

Clause 3: The method of any of clauses 1 or 2, wherein the absorbent polymer comprises a copolymer of 2-acrylamido-2-methylpropane sulfonate and acrylamide.

Clause 4: The method of any of clauses 1-3, wherein the absorbent polymer is present in the cleanout fluid in an amount of about 1 gpt to about 6 gpt.

Clause 5: The method of any of clauses 1-4, wherein nanoparticles comprise at least one selected from the group consisting of metal hydroxides, iron hydroxide, metal oxides, iron oxide, aluminum oxide, suboxides, oxyhydroxides, hematite, magnesium, nickel, zinc, magnetite, metal carbonates, calcium carbonate, metal sulphates, barium sulfate, metal sulfides, iron sulfide, and any combination thereof.

Clause 6: The method of any of clauses 1-5, wherein the lubricant is present in the cleanout fluid in an amount of about 100 gpt to about 300 gpt.

Clause 7: The method of any of clauses 1-6, wherein the nanoparticles are present in an amount of about 1 wt % to about 3 wt %, based on the weight of the lubricant; and the colloidal dispersion fluid comprises at least one oleaginous fluid and the at least one oleaginous fluid is present in an amount of about 95 wt % to about 99 wt %, based on the weight of the lubricant.

Clause 8: The method of any of clauses 1-7, wherein the cleanout fluid is foamed and further comprises a gas constituent.

Clause 9: The method of any of clauses 1-8, wherein the cleanout fluid further comprises a foaming agent.

Clause 10: The method of clause 1-8, wherein the cleanout fluid does not comprise a surfactant foaming agent.

Clause 11: The method of clause 10, wherein the wellbore is an extended reach well.

Clause 12: A wellbore cleanout fluid comprising: an aqueous base fluid, an absorbent polymer, and a lubricant; wherein the lubricant comprises a colloidal dispersion fluid and nanoparticles, the nanoparticles present in an amount of about 0.1 wt % to about 10 wt %, based on the weight of the lubricant; wherein the nanoparticles have a particle size distribution characterized by a D50 value of about 1 nm to about 120 nm.

Clause 13: The wellbore cleanout fluid of clause 12, wherein the absorbent polymer comprises a copolymer of 2-acrylamido-2-methylpropane sulfonate and acrylamide.

Clause 14: The wellbore cleanout fluid of any of clauses 12 or 13, wherein the absorbent polymer is present in the cleanout fluid in an amount of about 1 gpt to about 6 gpt.

Clause 15: The wellbore cleanout fluid of any of clauses 12-14, wherein nanoparticles comprise at least one selected from the group consisting of metal hydroxides, iron hydroxide, metal oxides, iron oxide, aluminum oxide, suboxides, oxyhydroxides, hematite, magnesium, nickel, zinc, magnetite, metal carbonates, calcium carbonate, metal sulphates, barium sulfate, metal sulfides, and iron sulfide.

Clause 16: The wellbore cleanout fluid of any of clauses 12-15, wherein the absorbent polymer is present in the cleanout fluid in an amount of about 1 gpt to about 6 gpt.

Clause 17: The wellbore cleanout fluid of any of clauses 12-16, wherein the lubricant is present in the cleanout fluid in an amount of about 100 gpt to about 300 gpt.

Clause 18: The wellbore cleanout fluid of any of clauses 12-17, wherein the nanoparticles are present in an amount of about 1 wt % to about 3 wt %, based on the weight of the lubricant; and the colloidal dispersion fluid comprises at least one oleaginous fluid and the at least one oleaginous fluid is present in an amount of about 95 wt % to about 99 wt %, based on the weight of the lubricant.

EXAMPLES

To facilitate a better understanding of the embodiments of the present disclosure, the following examples of preferred or representative embodiments are given. In no way should the following examples be read to limit, or to define, the scope of the invention. Table 1 shows the formulation of SureLube HT used in the examples.

TABLE 1

| CAS No. | Name | Amount (Wt %) |
|---|---|---|
| 122-32-7 | Glyceryl trioleate | 85-90 |
| 67701-03-5 | Stearine, fatty acids C16-18 | 5-10 |
| 64741-44-2 | Distillates, petroleum, middle, chemically neutralized | 1-3 |
| 1309-33-7 | Ferric hydroxide | 1-3 |

Table 2 shows the various lubricants in a 20 wt % NaCl field brine that were tested for their coefficient of friction.

TABLE 2

| Lubricant | Amount (Vol. %) |
|---|---|
| No lubricant | NA |
| Radiagreen EME | 2 |
| FCX-Plus | 2 |
| SureLube HT | 2 |

FIG. 1 shows the coefficient of friction for the lubricants of Table 2 and a test run without a lubricant. The lubricants were tested by hot-rolling at 300° F. for 16 hours in 20 wt % NaCl field brine on an Ofite lubricity tester model #112. The tested solutions had 2% of each lubricant in the tested solutions. As shown in FIG. 1, SureLube HT had a coefficient of friction of about 0.08. The coefficient of friction is the ratio of the measured torque required to rotate the testing surface and load applied to the testing surface. Except for lubricants that were field tested, which are discussed below, all coefficients of friction results discussed in the examples section were tested by hot-rolling at 300° F. for 16 hours via an Ofite lubricity tester model #112.

Table 3 shows other lubricants evaluated for their lubricating properties.

TABLE 3

| Test Sample | Coefficient of Friction, μ (torque reading/load) |
|---|---|
| No additives | 0.340 |
| 5.0 gpt guar slurry (20 ppt guar) | 0.300 |
| 1.0 gpt polyacrylamide friction reducer (slickwater) | 0.290 |
| 7.0 gpt AmpliClean ™ | 0.134 |
| 7.0 gpt AmpliClean ™ XR | 0.045 |
| 2% vol. SureLube ™ HT | 0.027 |

Figure 2:
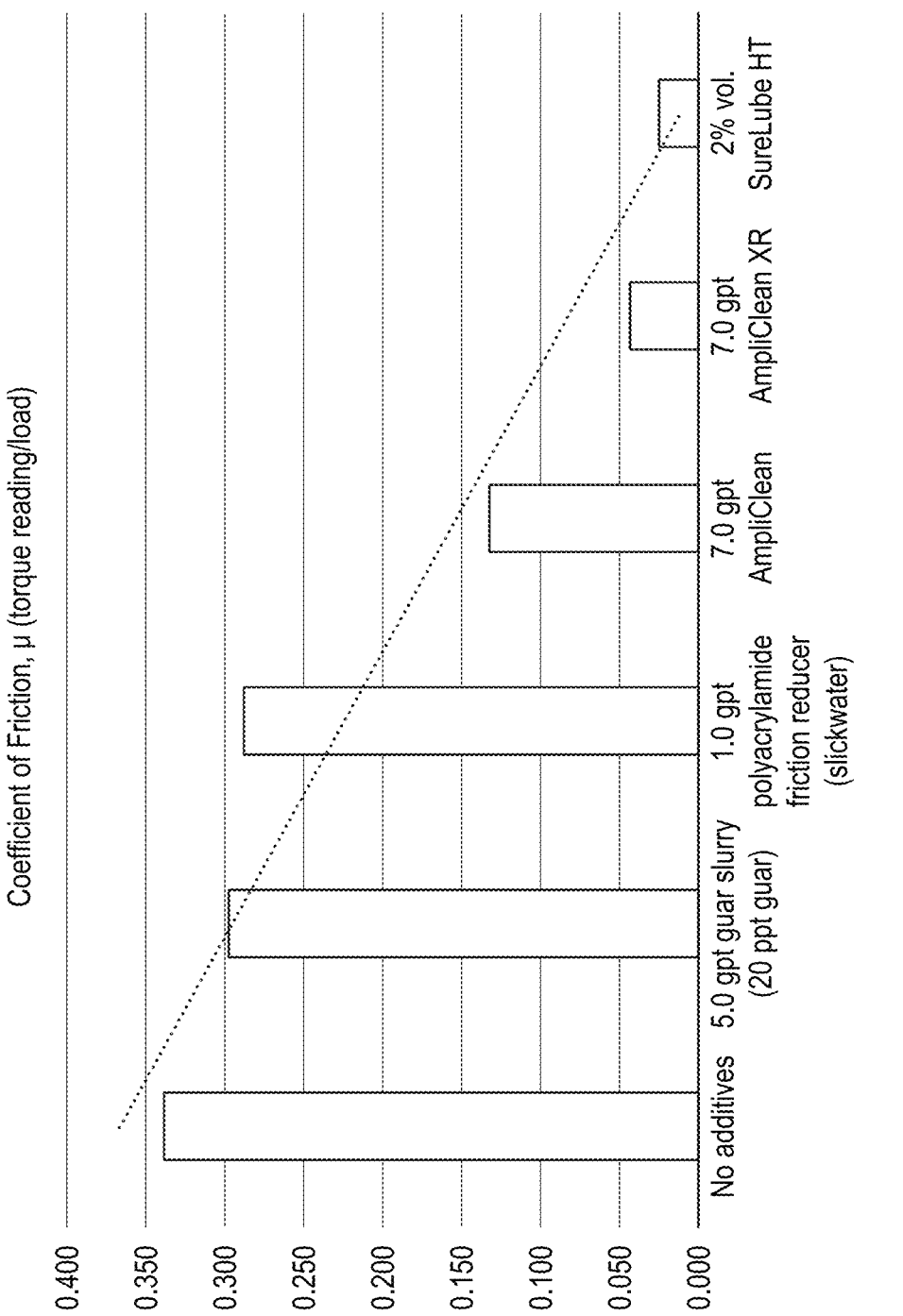
FIG. 2 shows the coefficient of friction for various lubricants in deionized water as discussed in the Examples.

The lubricant compositions in Table 3 were mixed in deionized water (DI water). FIG. 2 shows the results of coefficient of friction testing with the lubricant compositions in Table 3. SureLube HT had a significantly lower coefficient of friction compared to the other compositions.

Figure 3:
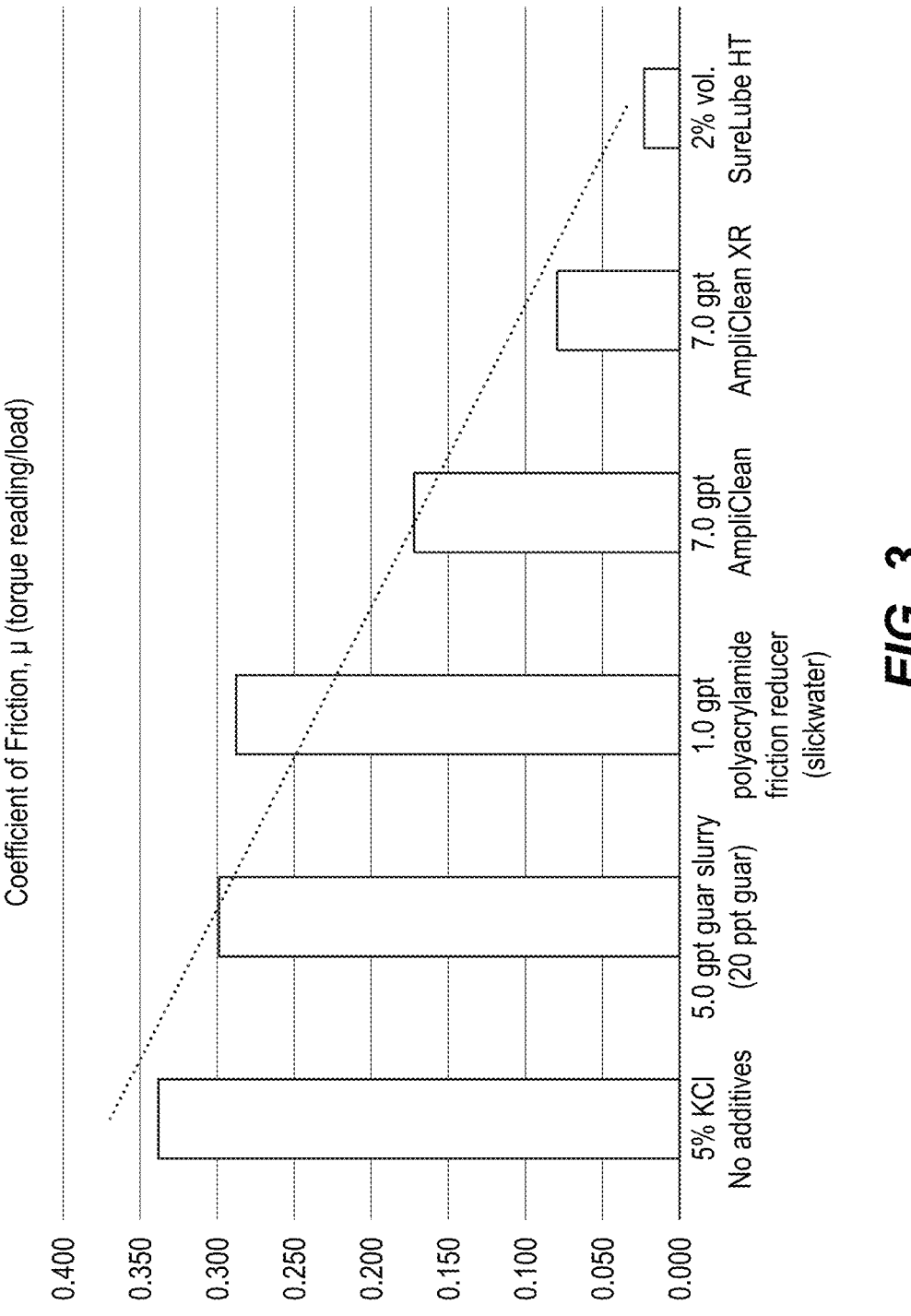
FIG. 3 shows the coefficient of friction for various lubricants in KCl brine as discussed in the Examples.

Next, the same compositions were tested in the same way, but in 5 wt % KCl brine instead of deionized water. FIG. 3 shows the results of the coefficient of friction testing. SureLube HT had a significantly lower coefficient of friction compared to the other compositions.

Table 4 shows pretreated base, clean, and dirty sample water from a Permian field. Pretreated Permian field water includes a polyacrylamide friction reducer and a biocide in addition to the components listed in Table 4.

TABLE 4

| Sample Information | | | |
|---|---|---|---|
| Sample Name | Base | Clean | Dirty |
| Physical Properties: | | | |
| SG @ 72° F. | 1.004 | 1.014 | 1.023 |
| pH (72° F.) at lab | 7.66 | 8.55 | 8.90 |
| TDS, ppm | 4148 | 17900 | 30100 |
| Cations (mg/L): | | | |
| Boron (B) | 0.94 | 8.58 | 14.01 |
| Barium (Ba$^{+2}$) | 0.00 | 0.00 | 0.00 |

TABLE 4-continued

| Sample Information | | | |
|---|---|---|---|
| Sample Name | Base | Clean | Dirty |
| Calcium (Ca$^{+2}$) | 48.99 | 318.81 | 556.24 |
| Iron (Fe$^{+2}$) | 0.00 | 0.00 | 0.00 |
| Potassium (K$^+$) | 12.60 | 105.58 | 185.77 |
| Magnesium (Mg$^{+2}$) | 24.72 | 163.62 | 245.99 |
| Manganese (Mn$^{+2}$) | 0.00 | 0.00 | 0.00 |
| Sodium (Na$^+$) | 1289.51 | 5933.84 | 10341.60 |
| Strontium (Sr$^{+2}$) | 2.00 | 86.67 | 159.77 |
| Zinc (Zn$^{+2}$) | 0.00 | 0.00 | 0.00 |
| Anions (mg/L): | | | |
| Fluoride (F$^-$) | 0.00 | 0.00 | 0.00 |
| Chlorides (Cl$^-$) | 1110.36 | 9742.33 | 17092.33 |
| Nitrite (NO$_2^-$) | 0.00 | 0.00 | 0.00 |
| Bromide (Br$^-$) | 0.00 | 69.54 | 123.63 |
| Nitrate (NO$_3^-$) | 0.00 | 0.00 | 0.00 |
| Phosphate (PO$_4^{3-}$) | 0.00 | 0.00 | |
| Sulfate (SO$_4^{-2}$) | 1284.08 | 1083.90 | 960.81 |
| Alkalinity (mg/L): | | | |
| Bicarbonates (HCO$^3$) | 375 | 349 | 318 |
| Carbonates (CO$_3^{-2}$) | 0 | 38 | 102 |
| Hydroxide (OH$^-$) | 0 | 0 | 0 |
| Sulfides (mg/L): | | | |
| Hydrogen Sulfide (H$_2$S) | NA | NA | NA |

Table 5 below shows various compositions in the Permian field pretreated water and the coefficient of friction testing result.

TABLE 5

| Test Sample | Coefficient of Friction, μ (torque reading/load) |
|---|---|
| DI Water | 0.340 |
| 5% KCl | 0.340 |
| Base (1 gpt polyacrylamide friction reducer) | 0.241 |
| Base + 7.0 gpt AmpliClean XR | 0.316 |
| Base + 2% v/v SureLube HT | 0.115 |
| Clean | 0.175 |
| Clean + 7.0 gpt AmpliClean XR | 0.166 |
| Clean + 2% vv/v SureLube HT | 0.040 |
| Dirty | 0.176 |
| Dirty + 7.0 gpt AmpliClean XR | 0.143 |
| Dirty + 2% v/v SureLube HT | 0.056 |

Figure 4:
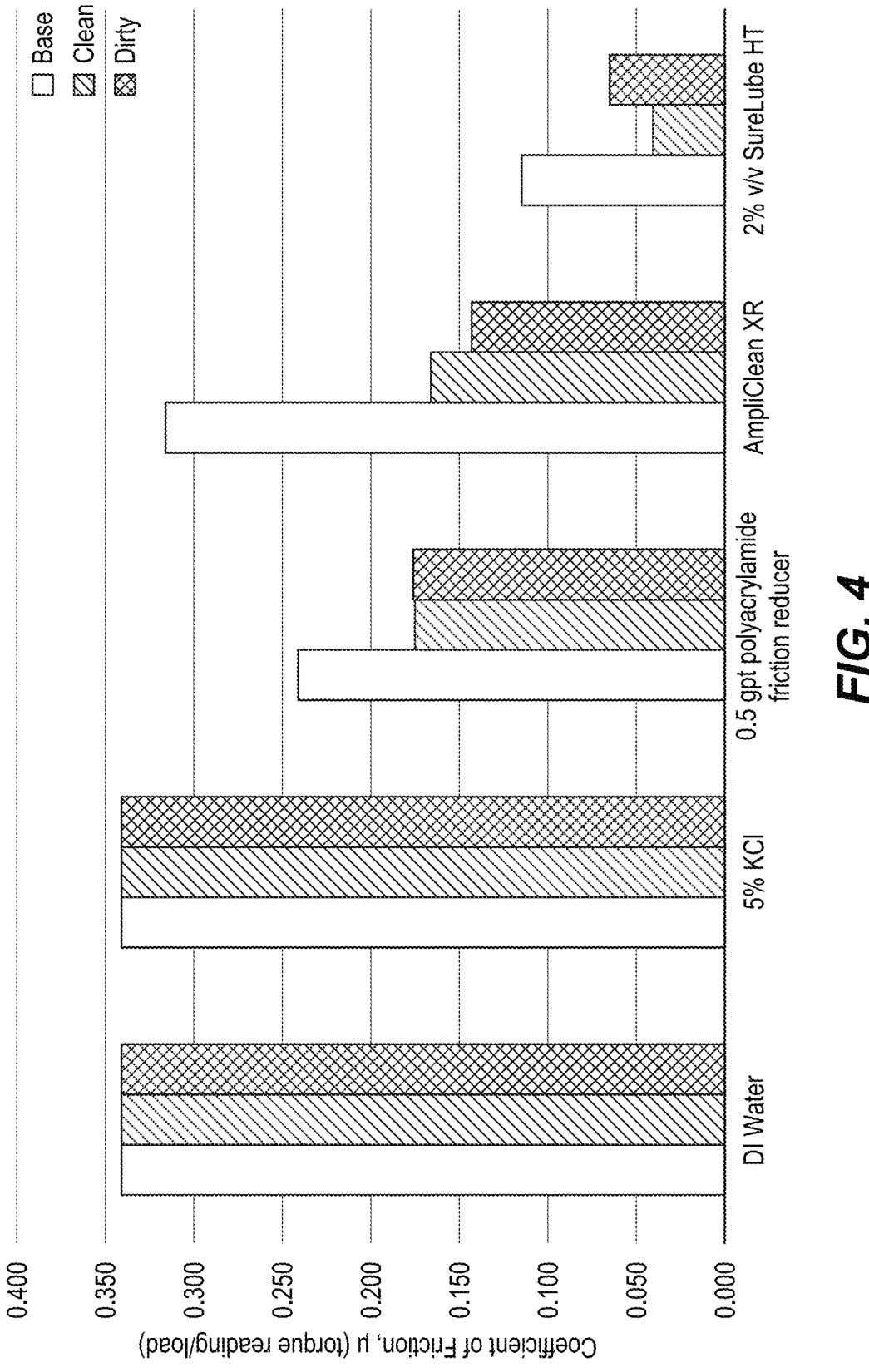
FIG. 4 shows the coefficient of friction for various lubricants in various oilfield pretreated waters as discussed in the Examples.

FIG. 4 shows the results of the coefficient of friction testing. SureLube HT had a significantly lower coefficient of friction compared to the other compositions.

Table 6 shows various compositions in Permian field synthetic water and the coefficient of friction testing result. Permian field synthetic water has the composition as that listed in Table 4 but lacks a biocide and polyacrylamide friction reducer.

TABLE 6

| Test Sample | Coefficient of Friction, μ (torque reading/load) |
|---|---|
| DI Water | 0.340 |
| 5% KCl | 0.340 |
| Base | 0.241 |
| Base + 2% v/v SureLube | 0.115 |
| Base (Synthetic) | 0.352 |
| Base (Synthetic) + 7 gpt AmpliClean | 0.199 |
| Base (Synthetic) + 7 gpt AmpliClean XR | 0.037 |
| Base (Synthetic) + 2% v/v SureLube | 0.038 |

TABLE 6-continued

| Test Sample | Coefficient of Friction, μ (torque reading/load) |
|---|---|
| Clean | 0.175 |
| Clean + 2% v/v SureLube | 0.040 |
| Clean (Synthetic) | 0.334 |
| Clean (Synthetic) + 7 gpt AmpliClean | 0.208 |
| Clean (Synthetic) + 7 gpt AmpliClean XR | 0.031 |
| Clean (Synthetic) + 2% v/v SureLube | 0.026 |
| Dirty | 0.176 |
| Dirty + 2% v/v SureLube | 0.065 |
| Dirty (Synthetic) | 0.338 |
| Dirty (Synthetic) + 7 gpt AmpliClean | 0.186 |
| Dirty (Synthetic) + 7 gpt AmpliClean XR | 0.035 |
| Dirty (Synthetic) + 2% v/v SureLube | 0.027 |

Figure 5:
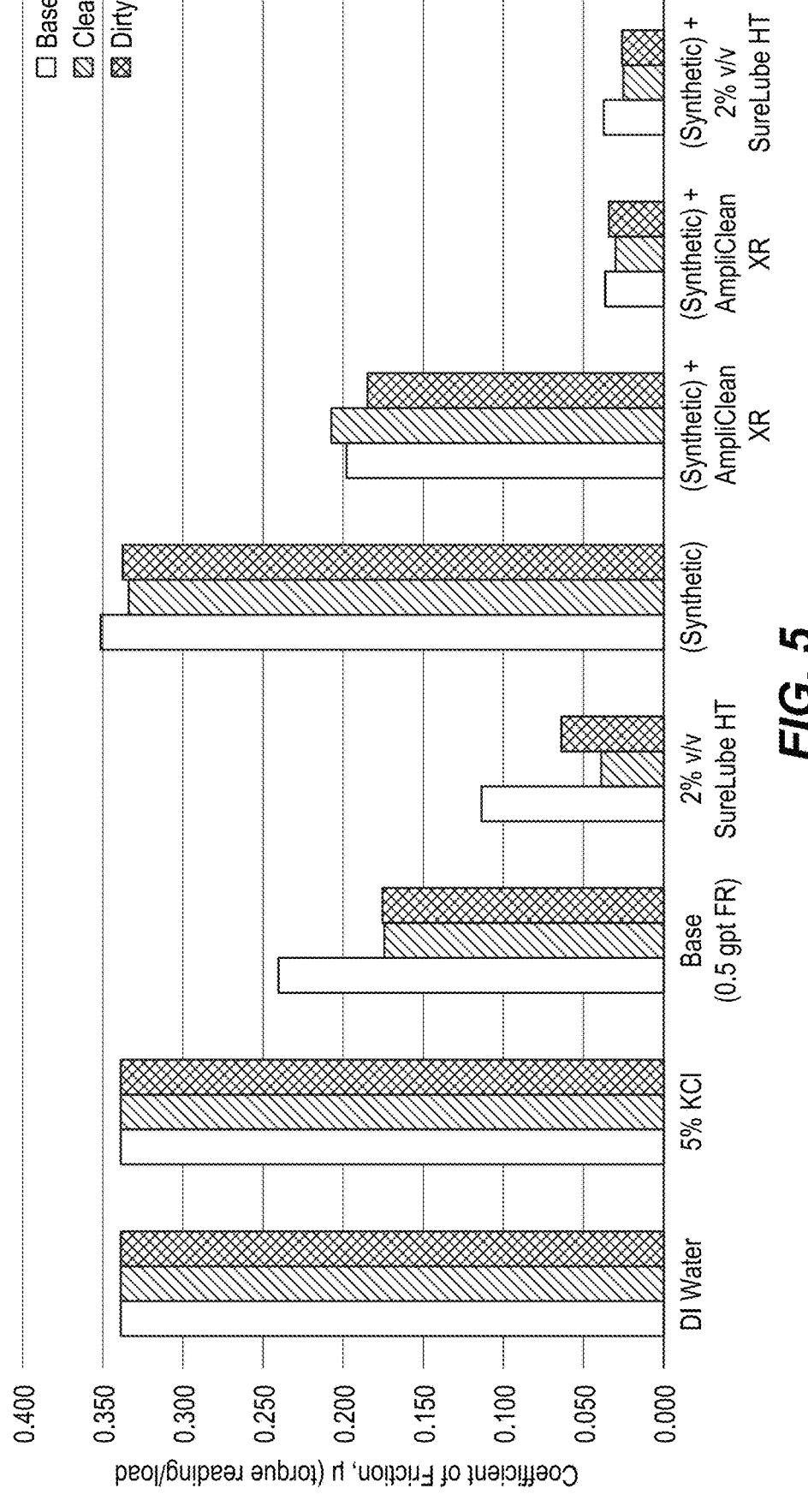
FIG. 5 shows the coefficient of friction for various lubricants in various oilfield synthetic waters as discussed in the Examples.

FIG. 5 shows the results of the coefficient of friction testing. SureLube HT had a significantly lower coefficient of friction compared to the other compositions.

Table 7 shows SureLabe and AmpliClean N in various formation waters from Bogota (Toberin, Paso 4, Tilo 3, STAP GDA, Boral 2).

TABLE 7

| SureLube | AmpliClean N | | | | |
|---|---|---|---|---|---|
| Concentration, % v/v | Toberin | Paso 4 | Tilo 3 | STAP GDA | Boral 2 |
| Water | 0.34 | | | | |
| 0.00 | 0.24 | 0.25 | 0.24 | 0.24 | 0.24 |
| 0.20 | 0.15 | 0.14 | 0.16 | 0.16 | 0.16 |
| 0.50 | 0.13 | 0.12 | 0.14 | 0.14 | 0.14 |
| 1.00 | 0.10 | 0.09 | 0.11 | 0.10 | 0.11 |
| 2.00 | 0.07 | 0.06 | 0.07 | 0.07 | 0.07 |

Figure 6:
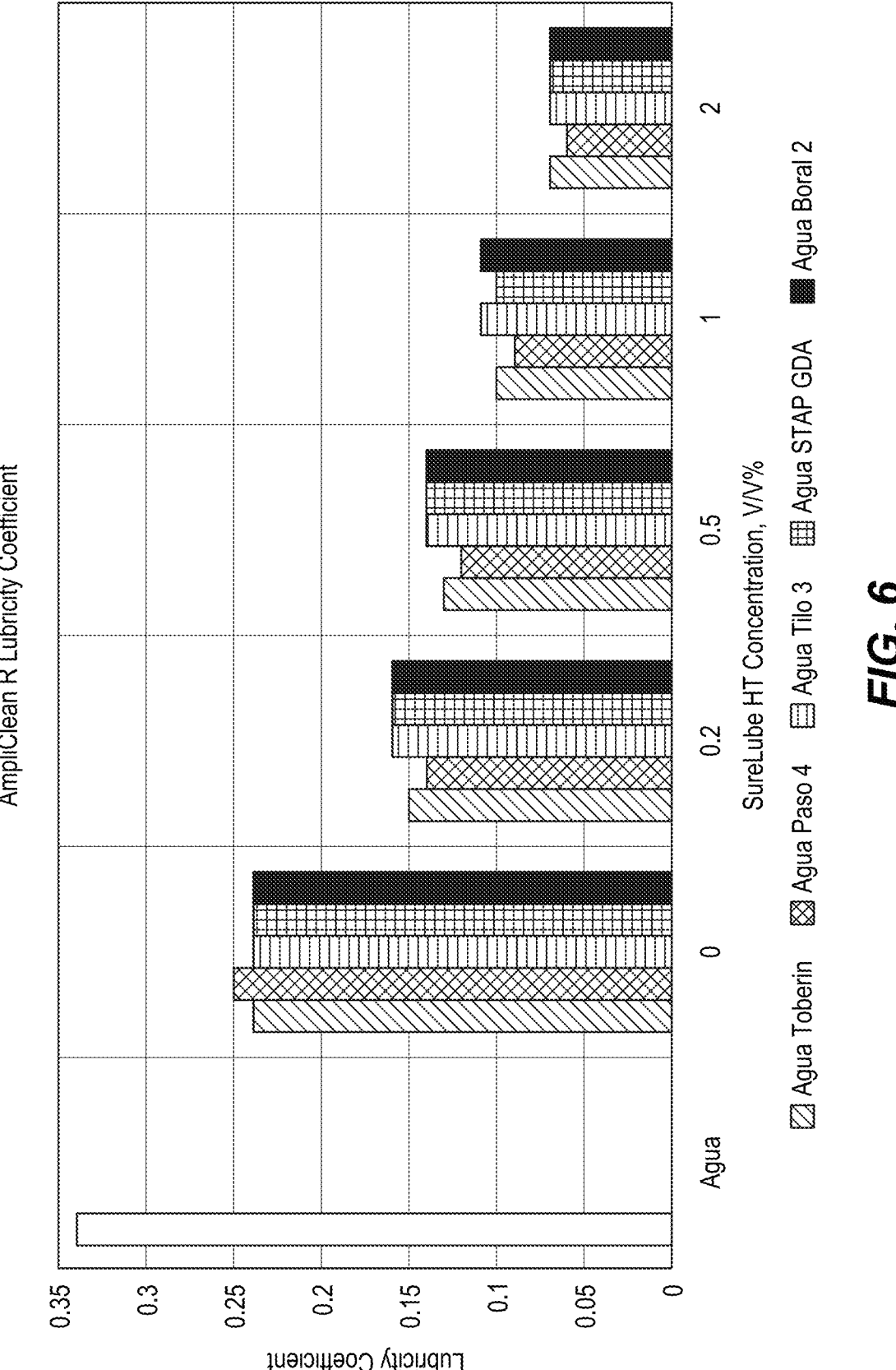
FIG. 6 shows the coefficient of friction for various lubricants in various oilfield waters from Bogota as discussed in the Examples.

FIG. 6 shows the coefficient of friction for SureLube HT with various formation waters of medium to high salinity. The figure shows that SureLube HT had a low lubricity coefficient with these various formation waters.

SureLube HT was field tested in wellbore cleanout operations with various wellbores in the Williston Basin. Five wellbores were tested for cleanout with SureLube HT and four wellbores were tested for cleanout with a control lubricant, which was a fatty acid amide lubricant.

Figure 7:
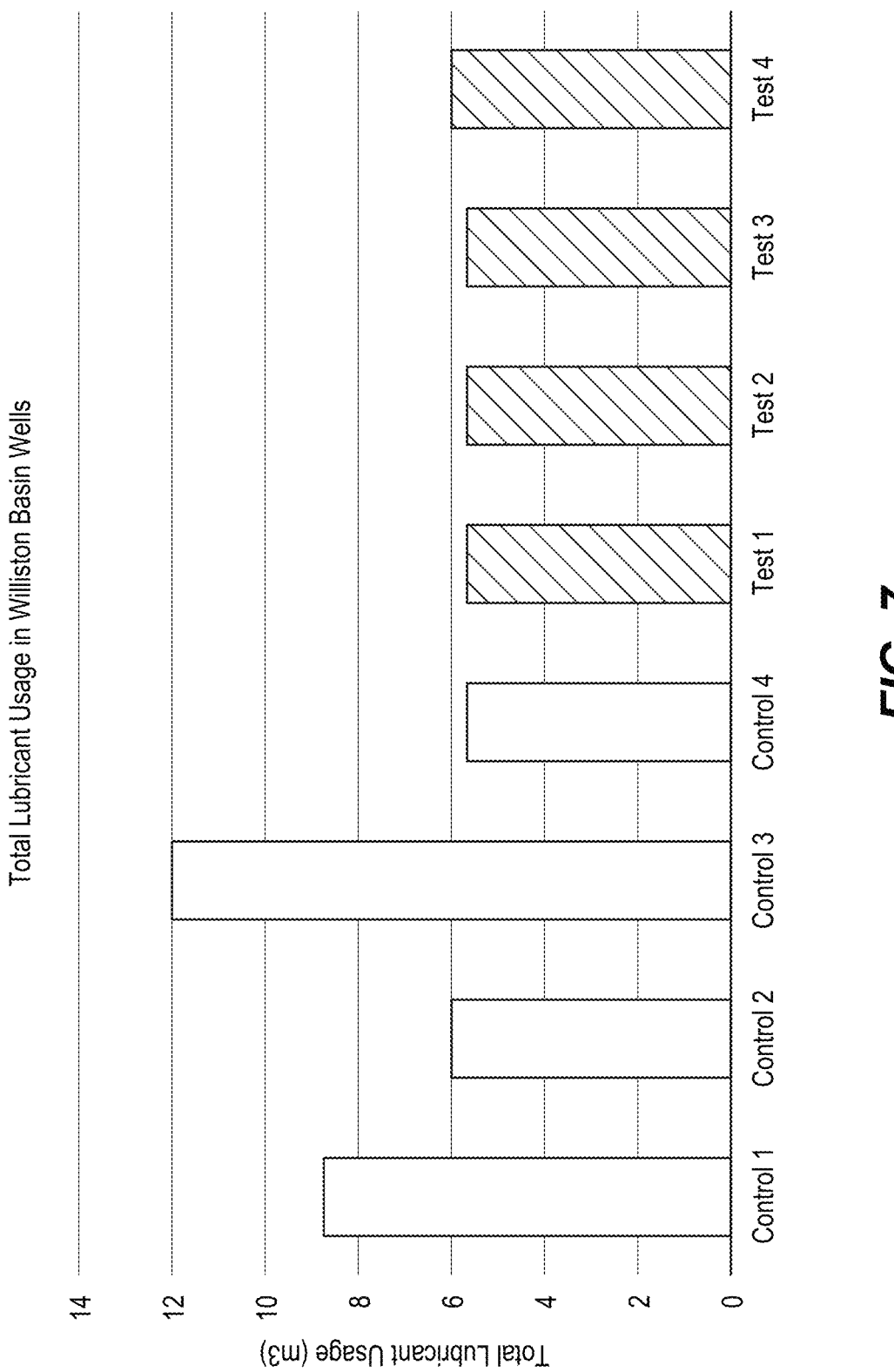
FIG. 7 shows the total lubricant used for control cleanout operations and test cleanout operations as discussed in the Examples.

FIG. 7 shows the total lubricant used for control cleanout operations and test cleanout operations. The figure shows that wellbore cleanout operations performed with SureLube HT used less lubricant.

Figure 8:
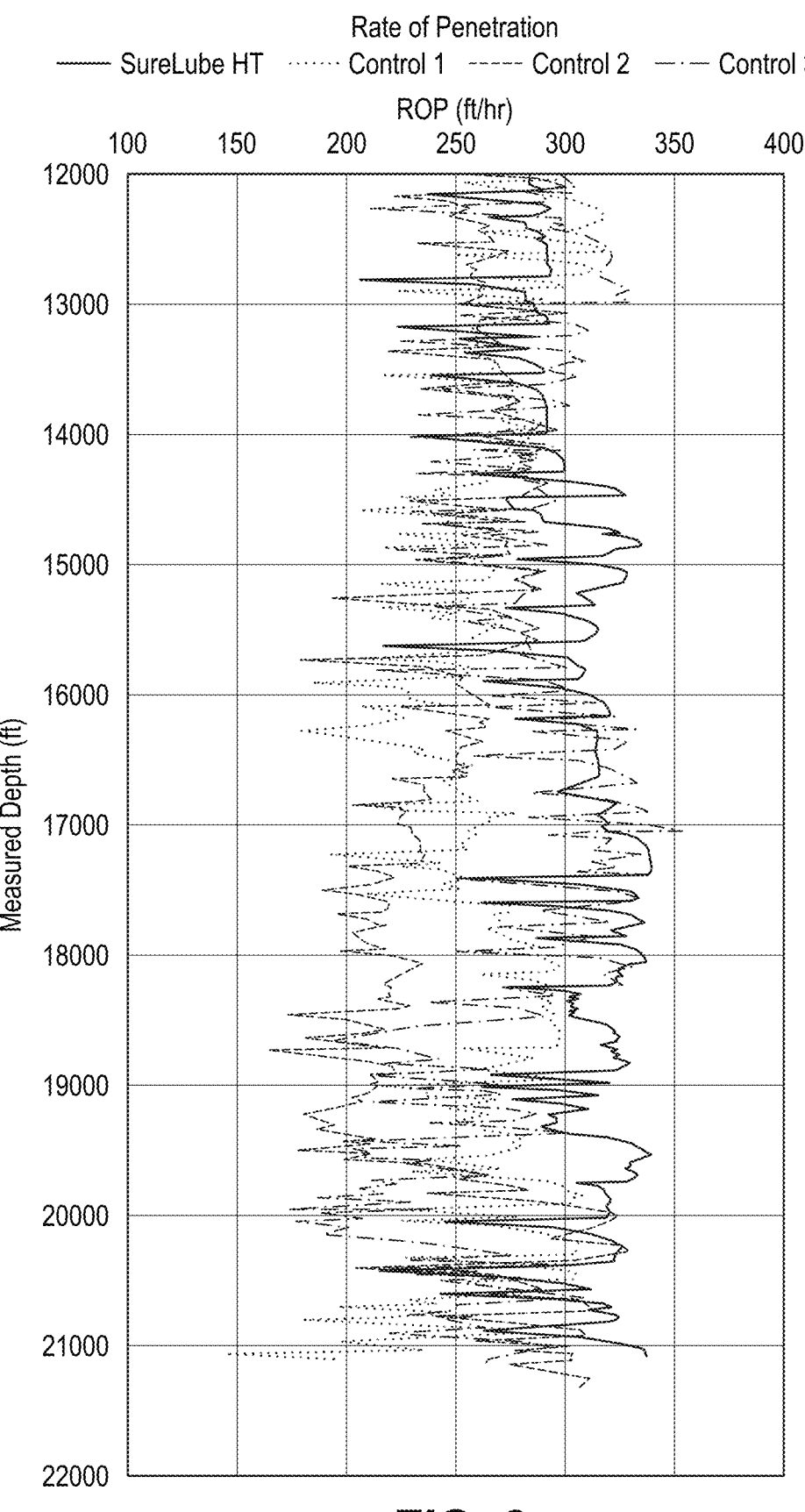
FIG. 8 shows the rate of penetration (ROP) versus depth for a wellbore cleanout operation using SureLube HT as discussed in the Examples.

FIG. 8 shows the rate of penetration (ROP) versus depth for a wellbore cleanout operation using SureLube HT and other operations without SureLube HT. It shows that the operation performed with SureLube HT had a higher ROP than the other operations.

Figure 9:
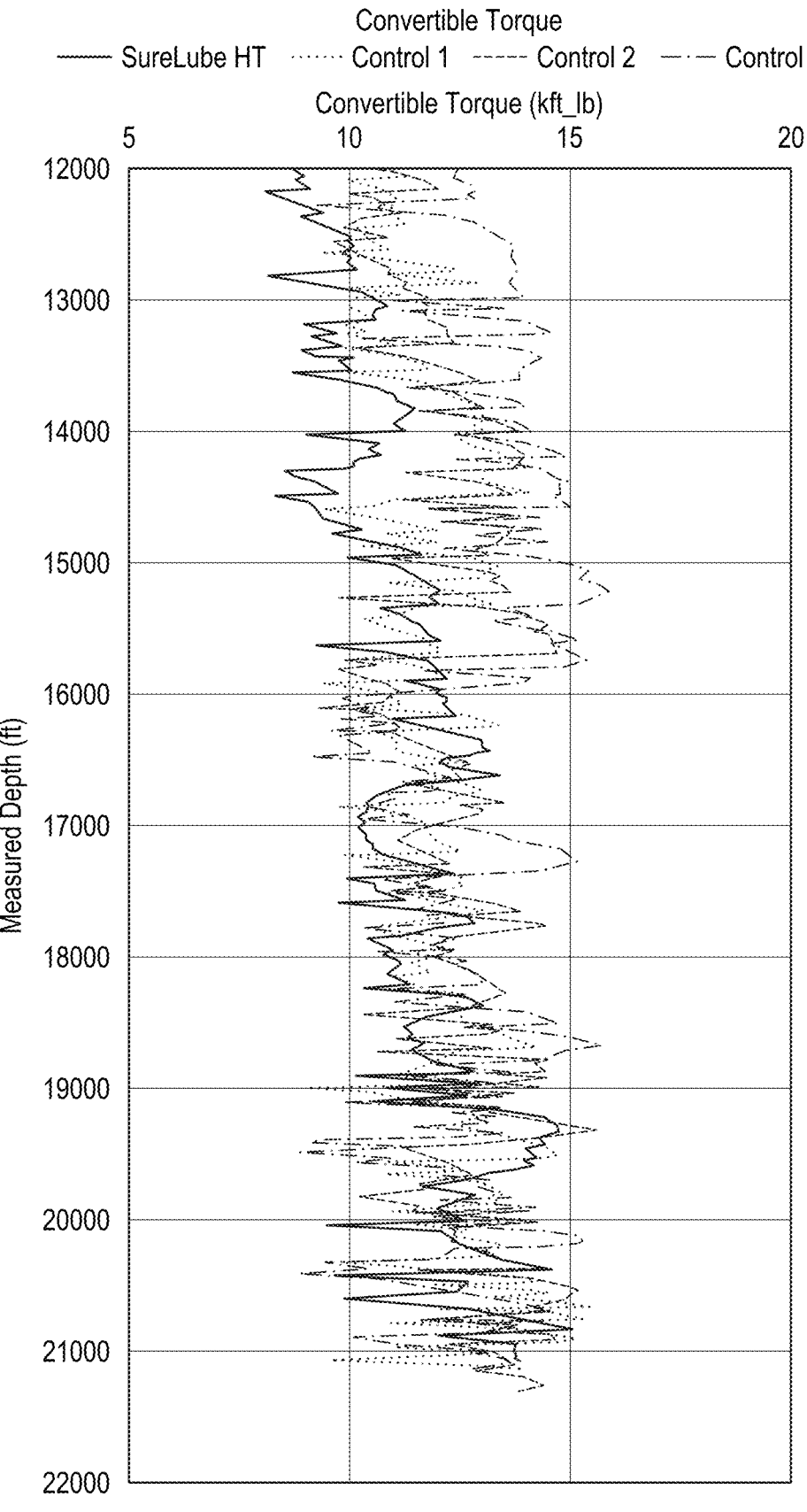
FIG. 9 shows the convertible torque versus depth for a wellbore cleanout operation using SureLube HT as discussed in the Examples.

FIG. 9 shows the convertible torque versus depth for a wellbore cleanout operation using SureLube HT and other operations without SureLube HT. The figure shows that the operation performed with SureLube HT had a lower average convertible torque than the control operations.

Figure 10:
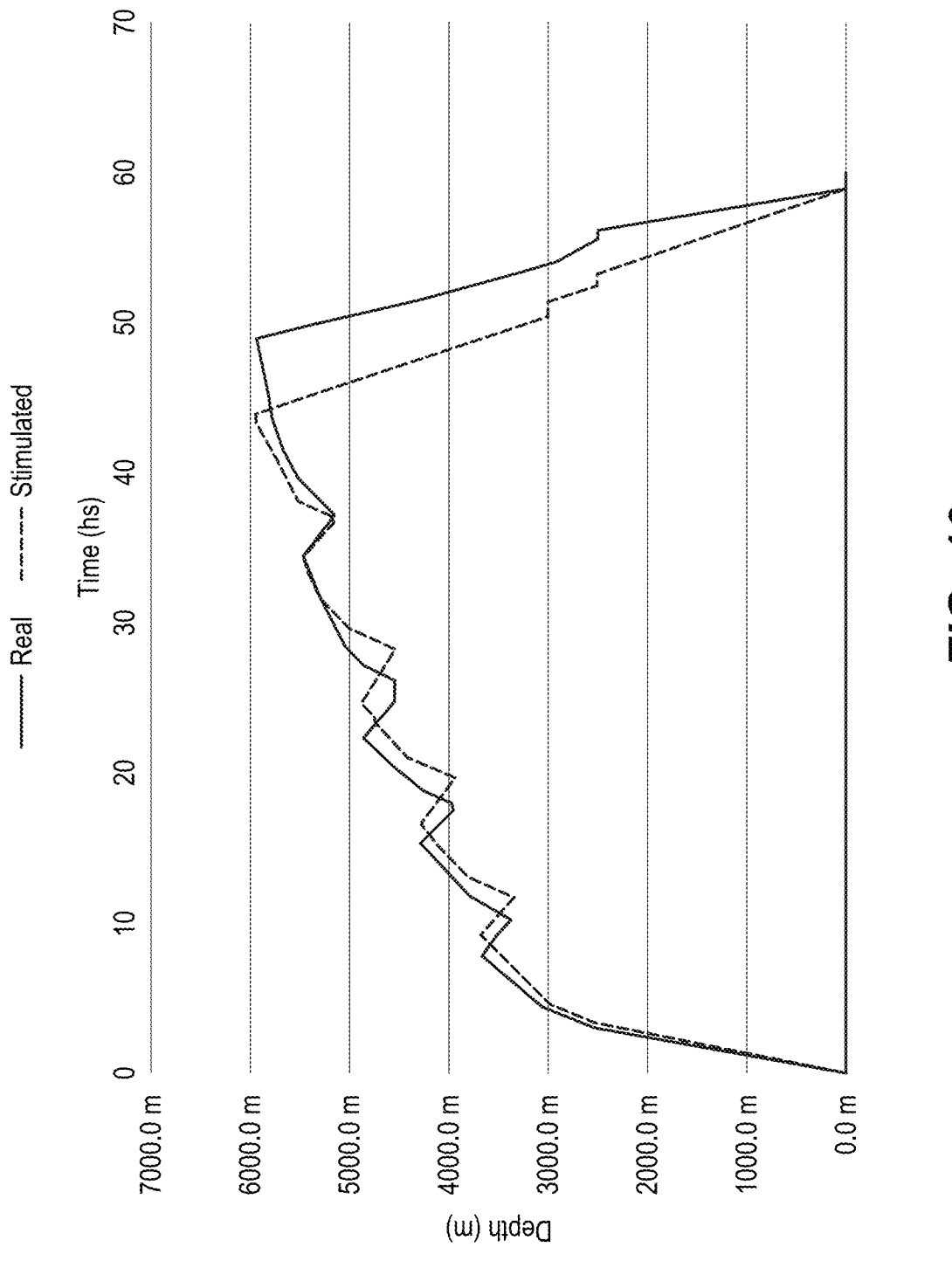
FIG. 10 shows the depth versus time for a wellbore cleanout operation performed without a lubricant as discussed in the Examples.

FIG. 10 shows time versus depth for a wellbore cleanout operation performed without a lubricant. The figure shows that the operation took about 60 hours to complete.

Figure 11:
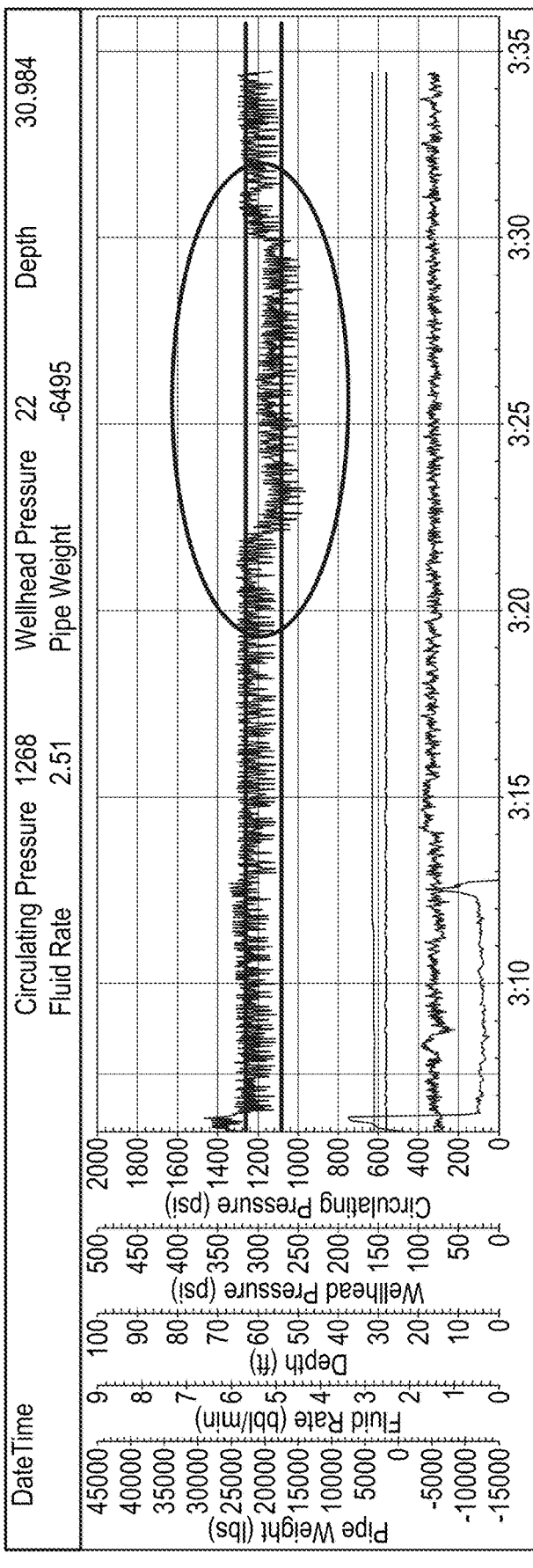
FIG. 11 shows the circulating pressure, wellhead pressure, depth, fluid rate, and pipe weight versus time for a wellbore cleanout operation performed without a lubricant as discussed in the Examples.

FIG. 11 shows circulating pressure, wellhead pressure, depth, fluid rate, and pipe weight versus time for a wellbore cleanout operation performed without a lubricant. In this operation, a pill of the absorbent polymer in an aqueous base fluid was added to the wellbore during a wellbore cleanout operation. This resulted in a circulating pressure drop from about 1290 psi to about 1080 psi.

Figure 12:
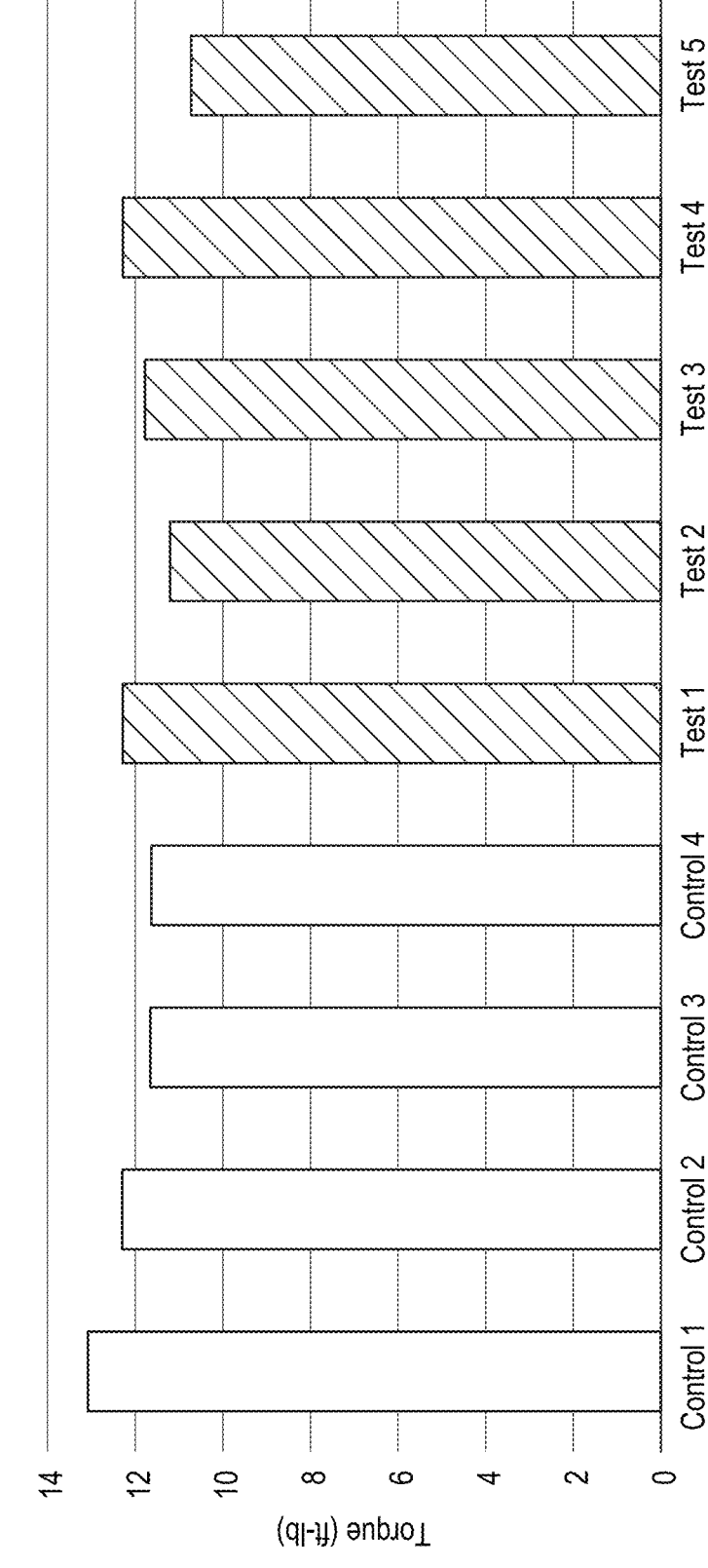
FIG. 12 shows the convertible torque for control and test wellbore cleanout operations as discussed in the Examples.

FIG. 12 shows the convertible torque for control and test well cleanout operations. The figure shows that the operations performed with SureLube HT had a slightly lower average convertible torque than the control operations.

Figure 13:
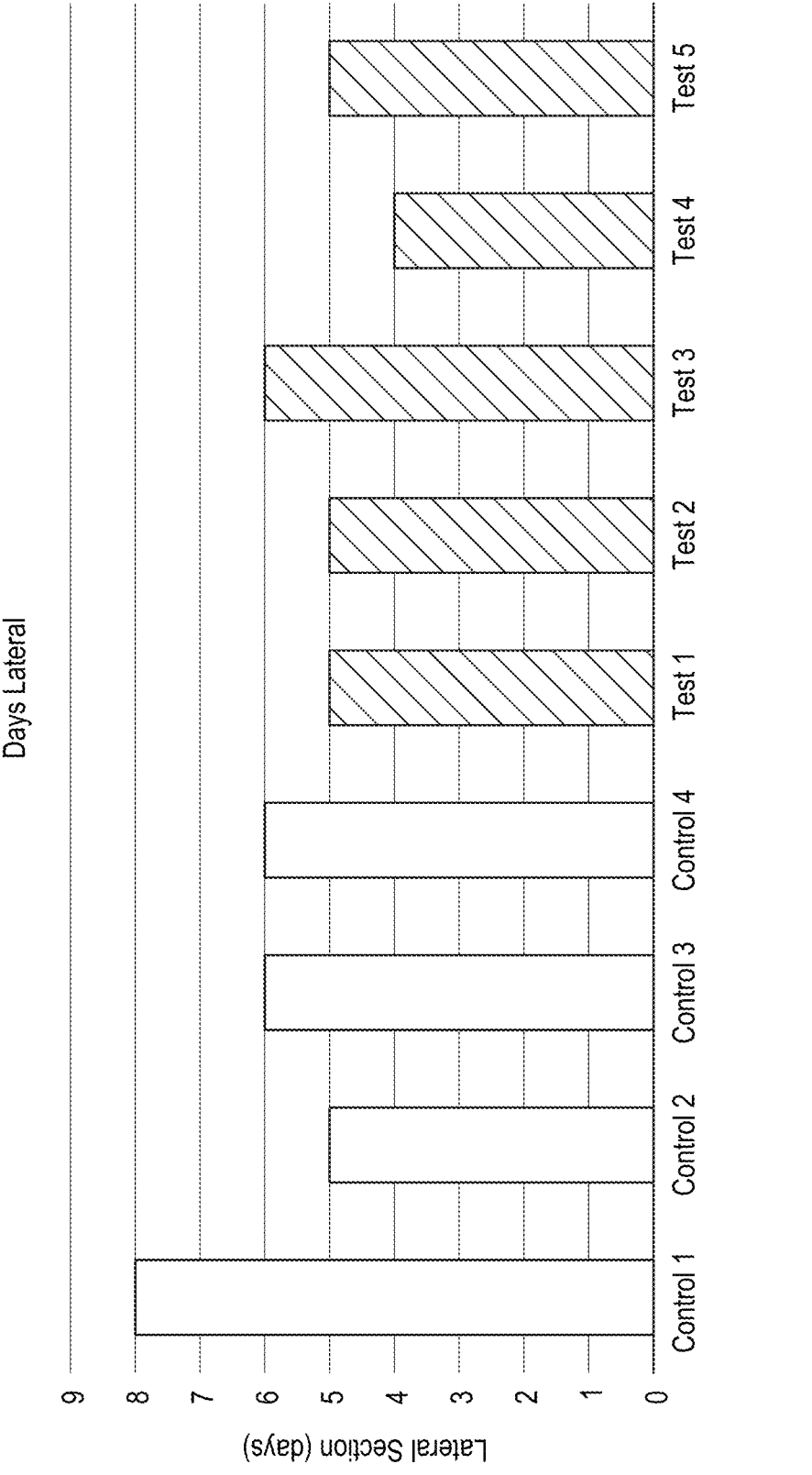
FIG. 13 shows the time in days to finish control and test wellbore cleanout operations as discussed in the Examples.

FIG. 13 shows the time in days to finish control and test wellbore cleanout operations. The figure shows that the operations performed with SureLube HT took less time than the control operations.

Wellbore cleanout operations performed with SureLube HT may use 30% to 50% less lubricant compared to other lubricants, run at 15% to 20% lower drilling torque, and/or have a 15% to 25% higher ROP. Wellbore cleanout operations on lateral wells performed with SureLube HT may be accomplished 15% to 38% faster compared to operations performed with other lubricants.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately α-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related, and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A method for wellbore cleanout comprising:
hydrating an absorbent polymer; subsequently
foaming a wellbore cleanout composition with a foaming gas to a foam quality of about 65% to about 80%; subsequently
introducing the wellbore cleanout composition through one or more conduits into a wellbore, the wellbore cleanout composition comprising
an aqueous base fluid, at about 86 wt % to about 99.8 wt %, by weight of the wellbore cleanout fluid, the absorbent polymer at about 0.1 wt % to about 4 wt %, by weight of the wellbore cleanout fluid, and a lubricant at about 0.1 wt % to about 10 wt %, by weight of the wellbore cleanout fluid;
wherein the lubricant comprises a colloidal dispersion fluid at about 99.9 wt % to about 90 wt %—and nanoparticles at about 0.1 wt % to about 10 wt %, by weight of the lubricant, the nanoparticles have a particle size distribution characterized by a D50 value of about 30 nm to about 90 nm and are present in an amount of about 0.1 wt % to about 10 wt %, based on the weight of the lubricant, and wherein the lubricant has a coefficient of friction of about 0.150 to about 0.027 as measured in deionized water.

2. The method of claim 1, wherein the one or more conduits comprise at least one selected from the group consisting of drilling string, tubing string, joined tubing, and coiled tubing.

3. The method of claim 1, wherein the absorbent polymer comprises a copolymer of 2-acrylamido-2-methylpropane sulfonate and acrylamide.

4. The method of claim 1, wherein the absorbent polymer is present in the cleanout fluid in an amount of about 1 gpt to about 6 gpt.

5. The method of claim 1, wherein nanoparticles comprise at least one selected from the group consisting of metal hydroxides, iron hydroxide, metal oxides, iron oxide, aluminum oxide, suboxides, oxyhydroxides, hematite, magnesium, nickel, zinc, magnetite, metal carbonates, calcium carbonate, metal sulphates, barium sulfate, metal sulfides, iron sulfide, and any combination thereof.

6. The method of claim 1, wherein the nanoparticles are present in an amount of about 1 wt % to about 3 wt %, based on the weight of the lubricant; and the colloidal dispersion fluid comprises at least one oleaginous fluid and the at least one oleaginous fluid is present in an amount of about 95 wt % to about 99 wt %, based on the weight of the lubricant.

7. The method of claim 1, wherein the cleanout fluid further comprises a foaming agent.

8. The method of claim 1, wherein the cleanout fluid does not comprise a surfactant foaming agent.

9. The method of claim 1, wherein the wellbore is an extended reach well.

10. The method of claim 1, wherein the wellbore comprises debris, further comprising circulating the wellbore cleanout composition in the wellbore; and removing debris from the wellbore via the return of the wellbore cleanout composition.

11. The method of claim 10, wherein the conduit comprises a jet nozzle and the method comprises using the jet nozzle to detach debris from the wellbore; suspending wellbore debris and detached debris in the wellbore cleanout composition; and removing wellbore debris and detached debris from the wellbore via the return of the wellbore cleanout composition.

* * * * *